US006802001B1

(12) United States Patent
Dent (10) Patent No.: US 6,802,001 B1
(45) Date of Patent: Oct. 5, 2004

(54) METHOD OF INCREMENTALLY ESTABLISHING AN ENCRYPTION KEY

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 903 days.

(21) Appl. No.: 09/696,450

(22) Filed: Oct. 25, 2000

(51) Int. Cl.[7] .............................................. G06F 17/00
(52) U.S. Cl. ...................... 713/171; 213/168; 213/169
(58) Field of Search ................................ 713/168–181, 713/182–183

(56) References Cited

U.S. PATENT DOCUMENTS 6,185,685 B1 * 2/2001 Morgan et al. ............. 713/183
6,615,193 B1 * 9/2003 Kingdon et al. ............ 713/172
6,633,980 B1 * 10/2003 Johnson ..................... 713/168

OTHER PUBLICATIONS

Shi et al., Signature based approach to fair document exchange, Communications, IEE Proceedings, vol. 150, Issue 1, Feb. 2003, pp. 21–27.*

Lin et al., Three–party encrypted key exchange without server public–keys, Comjmunication Letters, IEEE, Volumen 5, Issue 12, Dec. 2001, pp. 497–499.*

Moreau, Probabilistic encryption key exchange, Electronics Letters, vol. 31, Issue 25, Dec. 7, 1995, pp. 2166–2168.*

* cited by examiner

Primary Examiner—David Jung
(74) Attorney, Agent, or Firm—Coats & Bennett, PLLC (57) ABSTRACT

A method of determining an encryption key used by two or more parties for encrypted communications in a manner that prohibits any of the parties from forcing the final value of the encryption key. The encryption key is determined based on numbers exchanged by the parties using a key generation function, such as the Diffie-Hellman algorithm. To prevent any party from forcing the final value of the encryption key to a desired value, a first party divides its number into a plurality of parts, which are transmitted incrementally to the another. After transmitting a first part, the first party waits for receipt of at least a part of a second exchanged number from another party before the first party transmits the remaining parts of its exchanged number.

54 Claims, 4 Drawing Sheets

METHOD OF INCREMENTALLY ESTABLISHING AN ENCRYPTION KEY

BACKGROUND OF THE INVENTION

The present invention relates generally to cryptographic methods and, more particularly, to methods of establishing an encryption key between two or more parties.

Encryption is the process of disguising intelligible information, called plaintext, to hide its substance from eavesdroppers. Encrypting plaintext produces unintelligible data called ciphertext. Decryption is the process of converting ciphertext back to its original plaintext. Using encryption and decryption, two parties can send messages over an insecure channel without revealing the substance of the message to eavesdroppers.

A cryptographic algorithm or cipher is a mathematical function used in the encryption and decryption of data. A cryptographic algorithm works in combination with a key to encrypt and decrypt messages. The key, typically a large random number, controls the encryption of data by the cryptographic algorithm. The same plaintext encrypts to different ciphertext with different keys. In general, it is extremely difficult to recover the plaintext of a message without access to the key, even by an eavesdropper having full knowledge of the cryptographic algorithm.

One type of key-based cryptographic algorithm is a symmetric algorithm, also called secret key algorithms, in which the same key is used both for encryption and decryption. Symmetric algorithms require that the sender and receiver of the message agree on a secret key before they can communicate securely. One benefit of symmetric algorithms is that symmetric algorithms are fast. However, key distribution can be a problem, particularly where the communicating parties are in different physical locations. The parties must agree upon a key in secret, since anyone possessing the key can encrypt or decrypt messages. If the key is compromised, an eavesdropper can decrypt any messages encrypted to that key. The eavesdropper could also pretend to be one of the parties and produce false messages to fool the other party.

The Diffie-Hellman algorithm is a key exchange algorithm that allows two or more parties to agree on a secret key over an insecure channel without divulging the secret key. According to the Diffie-Hellman algorithm, the parties agree on two, non-secret prime numbers P1 and P2 which may be chosen at random with P2 being typically a large prime number. The security of the system is based on the difficulty of factoring numbers as large as P2. Each party generates a large random integer, denoted X1 and X2, respectively. The parties then calculate exchanged numbers Y1 and Y2, respectively. The first party computes Y1 using the equation $Y2=P1^{X1}$ mod P2. The second party computes Y2 using the equation $Y2=P1^{X2}$ mod P2. The first party transmits Y1 to the second party and second party transmits Y2 to the first party. The first party computes the key K using the $K=Y2^{X1}$ mod P2. The second party computes the key K using the equation $K=Y1^{X2}$ mod P2. Since $Y2^{X1}$ mod P2 and $Y1^{X2}$ mod P2 both equal $P1^{X1X2}$ mod P2, both parties compute the same key K. However, an eavesdropper cannot compute the key K with knowledge of only of P1, P2, Y1, and Y2. Therefore, the value K, which was computed independently by the two parties using information exchanged over the insecure channel, may be used by the parties as the secret key K for secure communications.

Typically, the parties using the Diffie-Hellman algorithm take turns exchanging information. Information sent in one direction triggers a response to be sent in the reverse direction until the encryption key is established. However, the second party normally receives the exchanged number Y1 from the first party prior to the first party receiving the exchanged number Y2 in return. Thus, the second party is in position to determine the encryption key K by combining the exchanged number received from the first party with the locally generated random number before the first party has received enough information to do likewise. Moreover, the second party can examine the encryption key K and decide that it does not suit a nefarious purpose and thus continue to generate further local random numbers until one is found that results in a desired encryption key K.

BRIEF SUMMARY OF THE INVENTION

The present invention establishes an encryption key between two or more parties in a manner that prohibits any party from forcing the value of the key to a desired value. The encryption key is based on exchanged values derived by each of the parties from random bitstrings. By incrementally sharing the exchanged values, the final value of the encryption key cannot be forced by one party to a certain value.

In one embodiment, the first party generates a first random number and computes a first exchanged number based on the first random number. The first exchanged number is split into at least two parts, with less than the total number of parts being sent to the second party to initiate a secure communication session. The second party generates a second random number, and then computes a second exchanged number based on the second random number. Because the second party does not yet have the remainder of the first exchanged number, the second party cannot choose a value for the second exchanged number that will force the encryption key to a desired value. The second exchanged number is then sent to the first party. The first party may then compute the encryption key. However, because the first party has already sent the second party a part of the first exchanged number, the first party likewise cannot force the value of the encryption key to a desired value. The first party sends the second party the remainder of the first exchanged number so that the second party can also determine the encryption key only after receiving at least a part of the second exchanged number.

More than two parties may take part in the establishment of the encryption key. Additionally, the exchanged numbers of each party may be split into more than two sections to further enhance the security of the key exchange procedure.

DETAILED DESCRIPTION OF THE INVENTION

Figure 1:
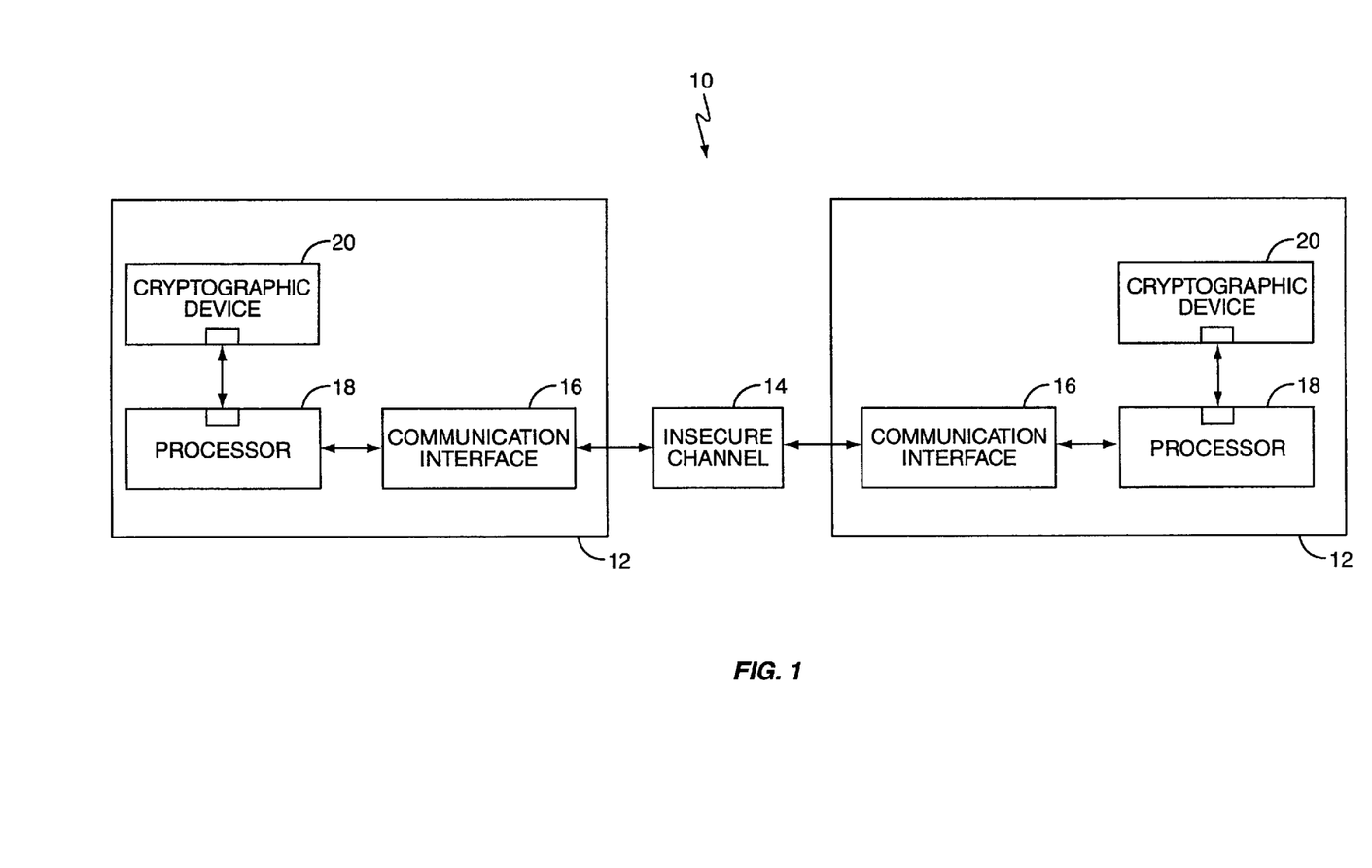
FIG. 1 is a block diagram of a cryptographic communication system of the present invention.

FIG. 1 illustrates a schematic diagram of a cryptographic communication system 10 for transmitting and receiving encrypted messages over an insecure channel. The cryptographic communication system 10 includes two or more communication devices 12 for communicating over an insecure channel 14. Although only two communication devices 12 are illustrated, the communication system 10 may in fact comprise numerous communication devices 12.

The term "communication device" as used herein refers to any device capable of transmitting and/or receiving information over a communication channel 14. The communication channel may be a wireline channel or a wireless channel. Communication devices may, for example, include a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a global positioning system (GPS) receiver. The term communication device also encompasses computing devices, such as a personal computer, laptop computer, or palmtop computer, that include a communications interface for communicating with other devices. Communication interfaces used in computing devices may for example comprise an Ethernet interface, serial interface, modem, radiotelephone transceiver, or any other interface typically used in a computer to communicate with other devices.

Each communication device 12 includes a communications interface 16, processor 18, and cryptographic device 20. Processor 18 controls the operation of the communication device 12 and may include either internal or external memory for storing control programs and data used during operation. Processor 18 may further perform some computational functions during the encryption and decryption steps of the communication. Processor 18, however, may or may not be a secure device such that data stored therein may, in some instances, be accessed by outside parties.

Cryptographic device 20 is a secure, tamper-proof device that includes a processor and memory used for cryptographic calculations, e.g. encryption and decryption. Cryptographic device 20 may for example comprise a "smart card" or tamper-proof chip. Data computed and stored within the cryptographic device 20 cannot be accessed by an outside source, thus providing security for the ciphering process. The cryptographic device 20 stores encryption variables, such as public and private keys, used in ciphering algorithms to encrypt and decrypt data. The encryption variables may be generated internally in the cryptographic device 20 to prevent the possibility of tampering or disclosure. Methods for generating and storing encryption keys and other encryption variables in a cryptographic device 20 are disclosed in a related U.S. patent application entitled "Secure Storage of Ciphering Information Using a PIN Code" filed simultaneously with this application, which is incorporated herein by reference. While shown in FIG. 1 as a separate device, the function of the cryptographic device 20 may in fact be incorporated into processor 18.

Communication interface 16 provides a means for interfacing the communications device with the communications channel 14. Communication interface 16 may have a variety of embodiments, including a radio frequency transceiver, Ethernet interface, modem, etc.

Figure 2:
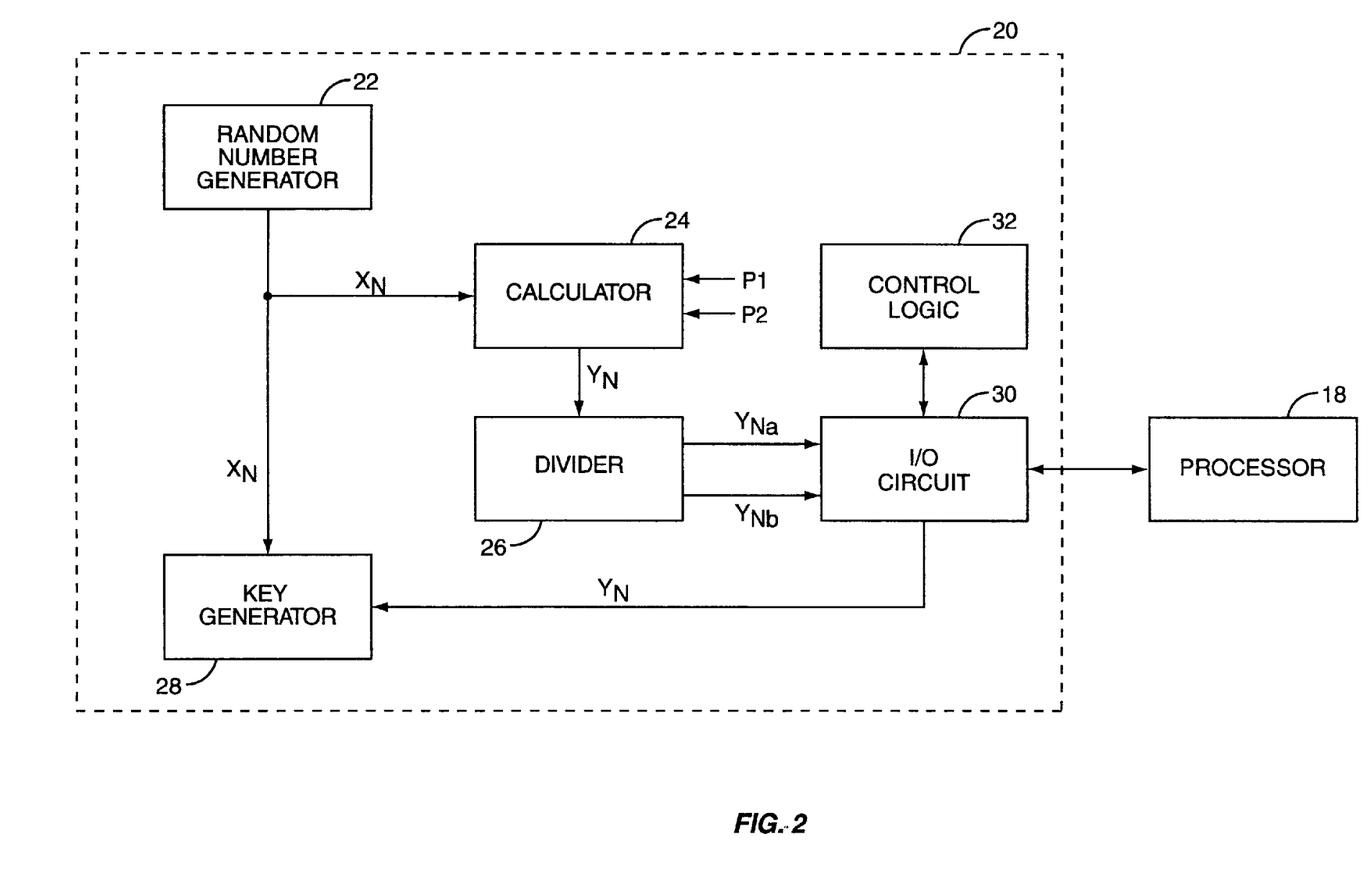
FIG. 2 is a block diagram of a cryptographic device used in a communication device in the cryptographic communication system of FIG. 1.

FIG. 2 is a more detailed functional block diagram of the cryptographic device 20 of the present invention. The cryptographic device 20 comprises a random number generator 22, exchanged number calculator 24, divider 26, key generator 28, input/output circuit 30, and control logic 32. Random number generator 22 generates random numbers used in computing secret keys. The random number, denoted $X_N$ (or XN) is typically in the order of 2048 bits in length. Calculator 24 computes a exchanged number, denoted $Y_N$ (or YN), based on the random number $X_N$ output from the random number generator 22 and two prime numbers P1 and P2 agreed upon in advance by the communicating parties. Divider 26 divides the exchanged number $Y_N$ into two or more parts, referred to herein as partial values denoted $Y_{NA}$, $Y_{NB}$, . . . Key generator 28 computes the secret key used in encrypted communications based on the random number $X_N$, and a second exchanged number $Y_2$, received from another communication device 12. Input/output circuit 30 interfaces the cryptographic device 20 with processor 18 in the communication device 12.

Control logic 32 controls the operation of the cryptographic device 20. There are only a limited set of valid commands that may be executed by control logic 32. Valid commands include, for example, requests to encipher or decipher data presented on the input/out circuit 30 and to return the result as output bits on the input/output circuit 30. Encryption and decryption may be performed using internally stored or externally supplied keys. When encryption or decryption is performed using a secret key, such as the private key of a public/private key cipher, it is generally desirable that the ciphering operation be performed internally within the cryptographic device 20 to avoid the need for the secret key to be output to external devices. In that case, there will be no legal command to request output of the secret key to which control logic 32 will respond. The details of the encryption and decryption operations are not material to the present invention, and the functional blocks representing these operations have therefore been omitted from FIG. 2.

The cryptographic device 20 may be implemented as software executing on a secure microprocessor, as hardware, or a combination of hardware and software. Multiple processors may be used to perform the various functions of the cryptographic device 20. Some of the functions of the cryptographic device 20 that do not reveal secret information may be performed in an insecure processor, such as processor 18. Such a variation will be readily apparent to those of ordinary skill in the art.

Figure 3:
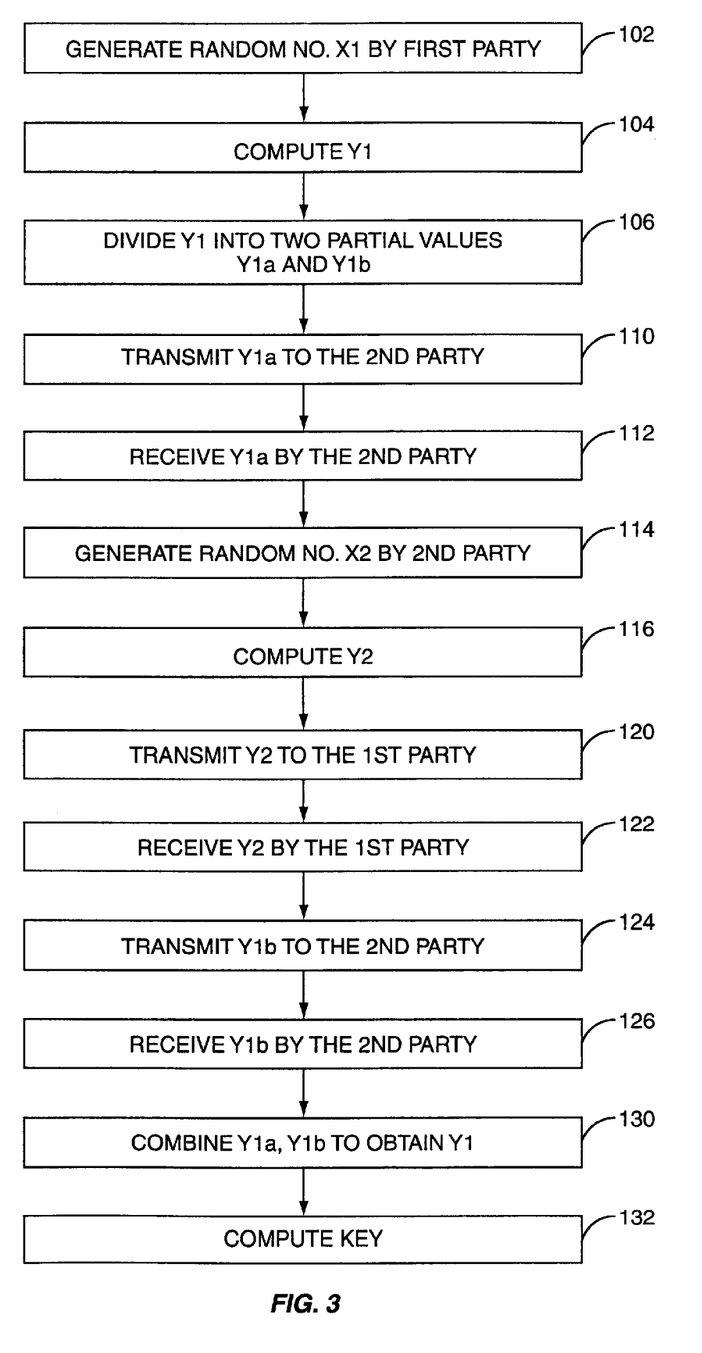
FIG. 3 is a flowchart illustrating a two party key establishment procedure in accordance with one embodiment of the present invention.

FIG. 3 illustrates an exemplary method of the present invention for incrementally establishing a secret key. The terms "first party" and "second party" will be use throughout to mean two independent users who want to share confidential information that is sent over a non-secure communication network. The information is assumed to be in digital form and may comprise any alphanumeric, audio, or graphic presentation of any length.

The two parties agree in advance on two large prime numbers P1 and P2. It is not necessary that these numbers be maintained in confidence, and may be communicated to other parties, or can be shared numbers used for encryption throughout the communication network. Security of the communication is based on the difficulty of factoring numbers as large as P2, which should be in the order of 2048 bits in length. In the exemplary embodiment, the number P2 is chosen such that (P2−1)/2 is also prime, which increases security of the procedure.

After two prime numbers P1 and P2 are chosen, the first party generates a first random number $X_1$ (block 102), and computes a first exchanged number $Y_1$ based on the first random number $X_1$ (block 104). The first exchanged number $Y_1$ can be computed, for example, using Diffie-Hellman exponentiation (e.g., $Y_1 = P1^{X_1} \mod P2$). The Diffie-Hellman protocol is disclosed in U.S. Pat. No. 4,200,770, herein incorporated by reference in its entirety. The first party then partitions the first exchanged number $Y_1$ into two or more partial values (block 106). In the exemplary embodiment, only two partial values, $Y_{1a}$ and $Y_{1b}$, are used. One of the partial values, denoted for example $Y_{1a}$, is sent to the second party (block 110).

After receiving partial value $Y_{1a}$ (block 112), the second party generates a second random number $X_2$ (block 114) and computes a second exchanged number $Y_2$ based on $X_2$ using, by way of example, Diffie-Hellman exponentiation (e.g., $Y_2 = P1^{X_2}$ mod P2) (block 116). The second party sends the second exchanged number $Y_2$, or a partial value thereof, to the first party (block 120). After receiving the second exchanged number $Y_2$ or partial value from the second party (block 122), the first party sends the second partial value $Y_{1b}$ to the second party (block 124). After receiving the second partial value $Y_{1b}$ (block 126), the second party combines the two partial values $Y_{1a}$ and $Y_{1b}$ to reproduce the first exchanged number $Y_1$ (block 130). The encryption key K may then be determined by each party (block 132).

In the exemplary embodiment, the first party determines the encryption key K by the formula $K = Y_2^{X_1}$ mod P2 and the second party by the formula $K = Y_1^{X_2}$ mod P2. The encryption key K may also be determined by the formula $K = p_1^{X_1 X_2}$ mod P2. The parties may then communicate in privacy using K in a symmetric encryption device.

The first party may divide the first exchanged number $Y_1$ into two or more partial values using a variety of methods provided the partial values can be recombined to recover the first exchanged number $Y_1$. In one embodiment, the first exchanged number $Y_1$ is divided into two equal length bitstrings. Examples include partial value $Y_{1a}$ being the most significant half of first exchanged number $Y_1$ and partial value $Y_{1b}$ being the least significant half. Alternatively, partial value $Y_{1a}$ may comprise the even numbered digits of the first exchanged number $Y_1$ and partial value $Y_{1b}$ may comprise the odd numbered digits. In general, any method of deriving partial $Y_1$ values $Y_{1a}$, $Y_{1b}$ that combine by means of $Y_1 = F(Y_{1a}, Y_{1b})$ may be used, so long as it is impossible to solve the equation in reverse for $Y_{1b}$, given $Y_{1a}$ and an arbitrary $Y_1$ value. Usually this condition would be satisfied if F is a non-linear function and $Y_{1b}$ is shorter than $Y_1$.

The second party is prevented from forcing the encryption key K to a predetermined value because the second party has obtained less than the entire value of the first exchanged number $Y_1$. The first party sends the exchanged number $Y_1$ incrementally so that the second party does not receive the entire number until the second party has sent at least a part of the second exchanged number $Y_2$. The second party cannot determine a value for $X_2$ that will result in a desired encryption key K. Likewise, the first party cannot change the remaining partial value $Y_{1b}$ without changing the partial value $Y_{1a}$ that was already sent to the second party. Changing the remaining partial value $Y_{1b}$ will result in an invalid value of $X_1$ which is needed to compute the encryption key K in step 132. Because P1 is prime, the first party is unable to solve the equation (old $Y_{1a}$; new $Y_{1b}$)=$P1^{X_1}$ mod P2. Therefore, the first party has no option but to release partial value $Y_{1b}$ to the second party and accept the resulting value of the encryption key K.

Additionally, in an embodiment in which the word lengths (measured in bits) of the quantities $X_1$, $X_2$, $Y_1$, $Y_2$, P1, P2, and K are similar, the number of bits in partial value $Y_{1b}$ should be around half the number of bits in K. There are not enough degrees of freedom left for the first party to change partial value $Y_{1b}$ to produce a desired value for encryption key K. In effect, the initial release of partial value $Y_{1a}$ by the first party restricts the final encryption key K to be a subset of the total key space, the members of the subset being unknown until the second exchanged number $Y_2$ is received. The encryption key K is restricted to an even smaller subset when the second party releases the second exchanged number $Y_2$. However, the second party cannot predict what members of that subset will be selected by the as yet unreceived partial value $Y_{1b}$.

The steps illustrated in FIG. 3 represent a minimum number of exchanges necessary for incrementally establishing an encryption key K. The number of exchanges may be increased for added security or for matching the number of exchanges to a desired protocol. For example, the second party may split the second exchanged number $Y_2$ into multiple parts, such as partial values $Y_{2a}$ and $Y_{2b}$. $Y_{2a}$ would be forwarded to the first party only after receiving a corresponding part of the first exchanged number $Y_1$ from the first party. In this example, partial value $Y_{2a}$ is returned after the second party receives partial value $Y_{1a}$, and partial value $Y_{2b}$ is returned only after receiving partial value $Y_{1b}$ from the first party. The first exchanged number $Y_1$ and the second exchanged number $Y_2$ may also be divided into more than two sections. Each exchange between parties reduces the possible options for the final key to a smaller subset. The values in the subset, however, cannot be predicted in the absence of yet-to-be received information. Therefore, a party cannot determine the bits of the partial value of the first exchanged number $Y_1$ or the second exchanged number $Y_2$ to be released next to guarantee that his desired value for the encryption key K will survive in the remaining subset.

Figure 4:
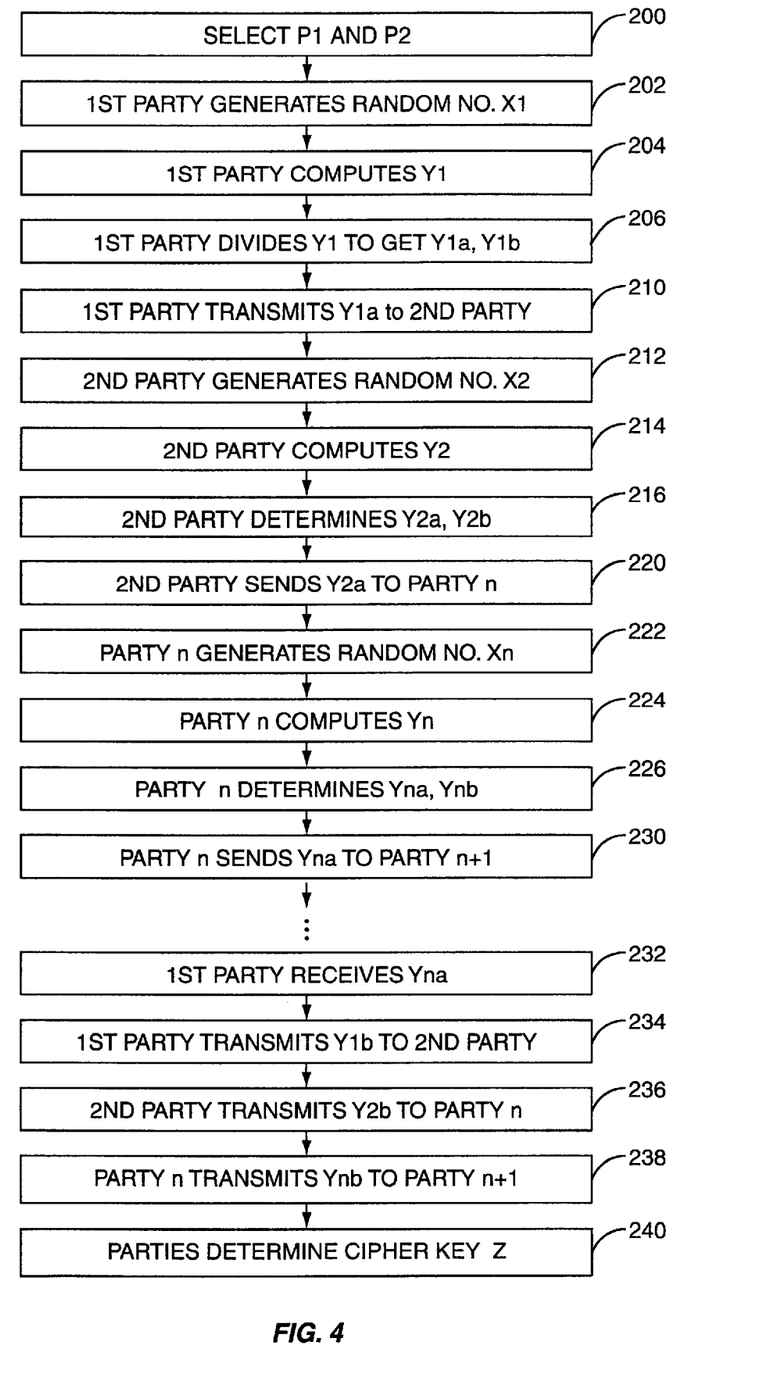
FIG. 4 is a flowchart illustrating a key establishment procedure for three or more parties.

The present invention may also be used for communications between more than two parties. FIG. 4 illustrates one embodiment of the steps when using more than two parties. All parties involved must first agree upon prime numbers P1 and P2 (block 200). The first party then generates a first random number $X_1$ (block 202), computes a first exchanged number $Y_1$ according to the formula $Y_1 = P1^{X_1}$ mod P2 (block 204), and divides the first exchanged number $Y_1$ into a plurality of parts, i.e., partial values (block 206). The first party then sends a first partial value $Y_{1a}$ to the second party (block 210) who generates a second random number $X_2$ (block 212) and computes a second exchanged number $Y_2$ by calculating $Y_2 = P1^{X_2}$ mod P2 (block 214). The second party divides the value $Y_2$ as necessary (block 216) and sends one of the partial values $Y_{2a}$ to the next party (block 220). Each party follows the procedure by generating a random number $X_n$ (block 222), computing a exchanged number of $Y_n = P1^{X_n}$ mod P2 (block 224), dividing the exchanged number $Y_n$ into parts (block 226), and sending one of the parts $Y_{na}$ to the next party (block 230). This process continues until the last party is reached. The last party sends its $Y_{na}$ to the first party.

The first party receives $Y_{na}$ from the last party (block 232) and then sends the remaining part or next part $Y_{1b}$ to the second party (block 234). This process continues until each party has received the full value of $Y_n$ from the preceding party (blocks 236, 238). Once each party has the entire exchanged number $Y_n$ from the preceding party, each can determine the encryption key (block 240) using a predetermined key generating function.

It is not required that the second and subsequent parties split their derived values since no party can force the key K to a desired value without knowledge of the value of $Y_{1b}$. However, incrementally transmitting the derived values by the second and subsequent parties increases the security of the procedure.

The present invention may be used in a wide variety of applications. By way of example, the present invention can be used in an electronic device to send a payment message from a buying party to a selling party in an e-commerce transaction. The message may include a code indicative of a monetary value which will be deleted from a cash balance in the buyer's device and added to a cash balance in the seller's device. It is obviously important that the message be exchanged using an enciphered link established between the parties. Receipt of a certain bitstring at the seller's terminal indicates receipt of a valid payment. The seller may record the bitstring on the communications channel to use it again fraudulently, either with the same seller or a different seller. However, if the bitstring is enciphered on the otherwise insecure channel 14, it will only be reusable if the encryption key used in another transaction happens to be, or is forced to be the same as in the first transaction. By using the present invention, one party is prevented from forcing the key K to a particular value.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of establishing a secret key used by a first party and a second party for encrypted communications, said method comprising:

generating a first exchanged number by said first party;

generating a second exchanged number by said second party;

dividing said first exchanged number into a plurality of parts comprising a first part and a final part;

incrementally transmitting said first exchanged number from said first party to said second party beginning with said first part of said first exchanged number and ending with said final part of said first exchanged number, wherein said final part of said first exchanged number is transmitted to said second party after receipt by said first party of at least a part of said second exchanged number from said second party;

after receipt by said second party of said first part of said first exchanged number from said first party, transmitting said second exchanged number from said second party to said first party; and computing said secret key by said second party as a function of said first exchanged number; and computing said secret key by said first party as a function of said second exchanged number.

2. The method of claim 1 wherein transmitting said second exchanged number from said second party to said first party comprises:

dividing said second exchanged number into a plurality of parts comprising a first part and a final part; and incrementally transmitting said second exchanged number from said second party to said first party beginning with said first part of said second exchanged number and ending with said final part of said second exchanged number, wherein said final part of said second exchanged number is transmitted to said first party after receipt by said second party of at least a part of said first exchanged number from said first party.

3. The method of claim 1 wherein dividing said first exchanged number into a plurality of parts comprises dividing bits of said first exchanged number into two or more groups of bits.

4. The method of claim 3 wherein dividing bits of said first exchanged number into two or more groups of bits comprises dividing bits of said first exchanged number into two or more groups of contiguous bits.

5. The method of claim 3 wherein dividing bits of said first exchanged number into two or more groups of bits comprises dividing bits of said first exchanged number into two or more groups of non-contiguous bits.

6. The method of claim 1 wherein dividing said first exchanged number into a plurality of parts comprises dividing said first exchanged number into a plurality of parts having a defined mathematical relationship.

7. The method of claim 6 wherein dividing said first exchanged number into a plurality of parts having a defined mathematical relationship comprises dividing said first exchanged number into a plurality parts whose sum equals said first exchanged number.

8. The method of claim 1 wherein generating a first exchanged number by said first party and generating a second exchanged number by said second party comprise computing said first and second exchanged numbers using a non-reversible function.

9. The method of claim 8 wherein computing said first and second exchanged numbers using a non-reversible function comprises raising a first prime number to the power of first and second random numbers respectively and reducing the result modulo a second prime number to obtain said first and second exchanged numbers.

10. The method of claim 9 wherein computing said secret key by said first party as a function of said second exchanged number comprises raising said second exchanged number to the power of said first random number and reducing the result modulo said second prime number.

11. The method of claim 10 wherein computing said secret key by said second party comprises raising said first exchanged number to the power of said second random number and reducing the result modulo said second prime number.

12. A method of establishing a secret key used by a first party and a second party for encrypted communications, said method comprising:

generating a first exchanged number;

dividing said first exchanged number into a plurality of parts comprising a first part and a final part;

incrementally transmitting said first exchanged number from said first party to said second party beginning with said first part and ending with each said final part, wherein said final part is transmitted to said second party after receipt by said first party of at least a part of a second exchanged number from said second party.

13. The method of claim 12 wherein dividing said first exchanged number into a plurality of parts comprises dividing bits of said first exchanged number into two or more groups of bits.

14. The method of claim 13 wherein dividing bits of said first exchanged number into two or more groups of bits comprises dividing bits of said first exchanged number into two or more groups of contiguous bits.

15. The method of claim 13 wherein dividing bits of said first exchanged number into two or more groups of bits comprises dividing bits of said first exchanged number into two or more groups of non-contiguous bits.

16. The method of claim 12 wherein dividing said first exchanged number into a plurality of parts comprises dividing said first exchanged number into a plurality of parts having a defined mathematical relationship.

17. The method of claim 16 wherein dividing said first exchanged number into a plurality of parts having a defined mathematical relationship comprises dividing said first exchanged number into a plurality parts whose sum equals said first exchanged number.

18. The method of claim 11 wherein generating a first exchanged number comprises computing said first exchanged number using a non-reversible function.

19. The method of claim 18 wherein computing said first exchanged number using a non-reversible function comprises raising a first prime number to the power of a random number and reducing the result modulo a second prime number to obtain said first exchanged number.

20. The method of claim 12 wherein computing said secret key by said first party comprises raising said second exchanged number to the power of said first random number and reducing the result modulo said second prime number.

21. A method of establishing a secret key used by a first party and a second party for encrypted communications, said method comprising:
   receiving a first part of a first exchanged number from said first party;
   generating a second exchanged number by said second party;
   transmitting at least a part of said second exchanged number from said second party to said first party following receipt by said second party of said first part of said first exchanged number;
   receiving by said second party remaining parts of said first exchanged number after transmitting at least a part of said second exchanged number to said first party; and
   computing by said second party said secret key as a function of said first exchanged number.

22. The method of claim 21 further comprising dividing said second exchanged number into a plurality of parts.

23. The method of claim 22 wherein transmitting at least a part of said second exchanged number from said second party to said first party comprises incrementally transmitting said plurality of parts of said second exchanged number to said first party after receiving from said first party corresponding parts of said first exchanged number.

24. The method of claim 22 wherein dividing said second exchanged number into a plurality of parts comprises dividing bits of said second exchanged number into two or more groups of bits.

25. The method of claim 24 wherein dividing bits of said second exchanged number into two or more groups of bits comprises dividing bits of said second exchanged number into two or more groups of contiguous bits.

26. The method of claim 24 wherein dividing bits of said second exchanged number into two or more groups of bits comprises dividing bits of said second exchanged number into two or more groups of non-contiguous bits.

27. The method of claim 22 wherein dividing said second exchanged number into a plurality of parts comprises dividing said second exchanged number into a plurality of parts having a defined mathematical relationship.

28. The method of claim 27 wherein dividing said second exchanged number into a plurality of parts having a defined mathematical relationship comprises dividing said second exchanged number into a plurality parts whose sum equals said second exchanged number.

29. The method of claim 21 wherein generating said second exchanged number comprises computing said second exchanged number using a non-reversible function.

30. The method of claim 29 wherein computing said second exchanged number using a non-reversible function comprises raising a first prime number to the power of a random number and reducing the result modulo a second prime number to obtain said second exchanged number.

31. The method of claim 30 wherein computing said secret key by said second party comprises raising said first exchanged number to the power of said random number and reducing the result modulo said second prime number.

32. A method of establishing an encryption key, the method comprising the steps of:
   generating a first random number by a first user;
   computing a first exchanged number from said first random number by said first user;
   dividing said first exchanged number into a plurality of parts by said first user;
   sending a first part of said first exchanged number from said first user to a second user;
   generating a second random number by said second user;
   generating a second exchanged number from said second random number by said second user;
   upon said second user receiving said first part of said first exchanged number from said first user, sending at least a part of said second exchanged number from said second user to said first user;
   upon said first user receiving at least a part of said second exchanged number from said second user, sending a final part of said first exchanged number from said first user to said second user;
   determining said encryption key by said first user using said second exchanged number received from said second user; and
   determining said encryption key by said second user using said first exchanged number received from said first user.

33. The method of claim 32 wherein computing said first exchanged number from said first random number by said first user comprises raising a first prime number to a power of said first random number and reducing the result modulo a second prime is number.

34. The method of claim 33 wherein computing said second exchanged number from said second random number by said second user comprises raising said first prime number to a power of said second random number and reducing the result modulo said second prime number.

35. The method of claim 32 wherein determining said encryption key by said first user comprises raising said second exchanged number to a power of said first random number and reducing the result modulo a second prime number.

36. The method of claim 32 wherein determining said encryption key by said second user comprises raising said first exchanged number to a power of said second random number and reducing the result modulo by said second prime number.

37. An apparatus for computing a secret key used in encrypted communications between two parties, said apparatus comprising:
   a random number generator to generate a first random number;
   a calculator to compute a first exchanged number based on said random number;
   a divider to divide said first exchanged number into a plurality of parts comprising a first part and a final part;
   a communications interface for transmitting and receiving data;
   control logic for controlling said communications interface to incrementally transmit said first exchanged number to a second party and to receive from said second party a second exchanged number; and a key generator for generating a secret key based on said first random number and said second exchanged number.

38. The apparatus of claim 37 wherein said calculator computes said first exchanged number by raising a first prime number to the power of said first random number and reducing the result modulo a second prime number.

39. The apparatus of claim 38 wherein said key generator computes said secret key by raising said first exchanged number to the power of said second exchanged number received from said second party and reducing the result modulo said second prime number.

40. The apparatus of claim 39 wherein said divider divides said first exchanged number into two or more groups of bits.

41. The apparatus of claim 40 wherein said two or more groups of bits include a first group of least significant bits and a second group of most significant bits.

42. The apparatus of claim 40 wherein said two or more groups of bits comprise a first group of even numbered bits and a second group of odd numbered bits.

43. The apparatus of claim 40 wherein said divider divides said first exchanged number into two or more parts having a defined mathematical relationship.

44. The apparatus of claim 41 wherein the sum of said two or more parts is equal to the value of said first exchanged number.

45. The apparatus of claim 37 wherein said control logic controls said communications interface such that the final part of said first exchanged number is output only after receipt of at least a part of said second exchanged number from said second party.

46. A communication system for engaging in encrypted communications between a first and a second party, said communication system comprising:

a first communication terminal communicating with a second communications terminal over a communications channel, said first communications terminal programmed to:
  divide a first exchanged number into a plurality of parts comprising a first part and a final part;
  incrementally transmit said first exchanged number to said second communications terminal such that said final part of said first exchanged number is transmitted to said second communications terminal only after receipt by said first communications terminal of at least a part of a second exchanged number from said second communications terminal; and a second communications terminal communicating over said communications channel with said first communications terminal, said second communications terminal programmed to receive said first exchanged number from said first party and to transmit said second exchanged number to said first party after receipt by said second communications terminal of at least a first part of said first exchanged number from said first communications terminal.

47. The system of claim 46 wherein said second communication terminal is further programmed to divide said second exchanged number into a plurality of parts and to incrementally transmit each part of said second exchanged number to said first communications terminal after receipt by said second communications terminal of a corresponding part of said first exchanged value from said first communication terminal.

48. The system of claim 46 wherein said first and second communications terminals are further programmed to compute a secret key based on said first and second exchanged numbers.

49. A communications terminal used by a first party to engage in encrypted communications with a second party, said communications terminal comprising:

a communications interface connecting said communications terminal to a communications channel; and a processor programmed to:
  divide a first exchanged number into a plurality of parts comprising a first part and a final part; and
  incrementally transmit said first exchanged number to said second communications terminal such that said final part of said first exchanged number is transmitted to said second communications terminal only after receipt by said first communication terminal of at least a part of a second exchanged number from said second communications terminal.

50. The communications terminal of claim 49 wherein said processor divides said first exchanged number into a plurality of parts by dividing bits of said first exchanged number into two or more groups of bits.

51. The method of claim 50 wherein said processor divides said first exchanged number into two or more groups of bits by dividing bits of said first exchanged number into two or more groups of contiguous bits.

52. The method of claim 50 wherein said processor divides said first exchanged number into two or more groups of bits by dividing bits of said first exchanged number into two or more groups of non-contiguous bits.

53. The method of claim 49 wherein said processor divides said first exchanged number into a plurality of parts by dividing said first exchanged number into a plurality of parts having a defined mathematical relationship.

54. The method of claim 53 wherein said processor divides said first exchanged number into a plurality of parts having a defined mathematical relationship by dividing said first exchanged number into a plurality parts whose sum equals said first exchanged number.

* * * * *